Aug. 9, 1932.    C. S. BRAGG ET AL    1,871,299
POWER ACTUATOR
Original Filed Nov. 22, 1924    3 Sheets-Sheet 1

Caleb S. Bragg
Victor W. Kliesrath
INVENTORS
BY
Louis Prevost Whitaker
ATTORNEY

Aug. 9, 1932. C. S. BRAGG ET AL 1,871,299
POWER ACTUATOR
Original Filed Nov. 22, 1924 3 Sheets-Sheet 2

Caleb S. Bragg
Victor W. Kliesrath INVENTORS
BY
Louis Prevost Whittaker
ATTORNEY Aug. 9, 1932.  C. S. BRAGG ET AL  1,871,299
POWER ACTUATOR
Original Filed Nov. 22, 1924   3 Sheets-Sheet 3
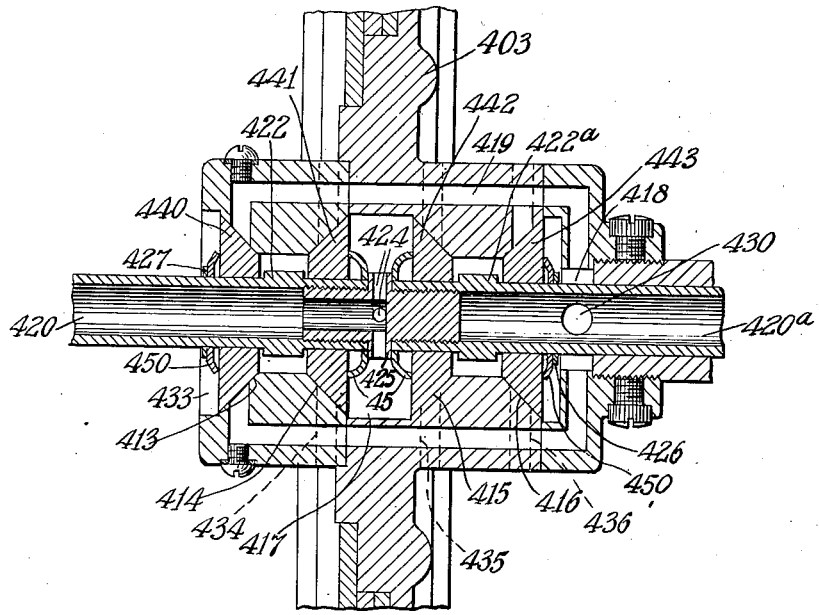
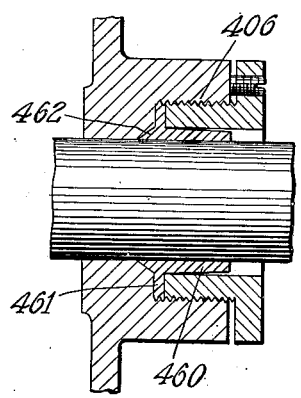

Patented Aug. 9, 1932

1,871,299

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed November 22, 1924, Serial No. 751,481. Renewed February 7, 1931.

Our invention consists in the novel features hereinafter described, reference being had to the accompanying drawings, which illustrate several forms of the same selected by us for purposes of illustration, and the said invention is fully disclosed in the following description and claims.

Our present invention consists in improvements in power actuators of the kind illustrated in our former application for Letters Patent of the United States filed December 22, 1923, Serial No. 682,346, such actuators being especially adapted for use in connection with automotive vehicles for operating steering mechanism and brake mechanism of automobiles, steering mechanism and clutch mechanism of motor boats, and for any other purpose for which they may be found to be advantageous or desirable. Actuators of this type comprise a cylinder, closed at both ends, a double acting piston in the cylinder, means for establishing differential pressures on opposite faces of the piston, and reversing valve mechanism, the piston being connected to the part to be actuated by means of a piston rod, and the reversing valve mechanism being actuated by an operator operated part. The actuator may be operated either by suction acting on one face of the piston in conjunction with air at atmospheric pressure acting on the other face of the piston, or by pressure fluid acting against air at atmospheric pressure, or by pressure acting against suction or partial vacuum. The internal combustion engine with which automotive vehicles are usually provided for the purpose of furnishing the propulsive power thereof, furnishes at all times during its operation, differential pressures which may be employed for the operation of the actuator. Thus, there is a suction or rarification produced by the cylinders in the suction passage of the engine between the cylinder and the throttle valve, which is at its maximum of suction or rarification when the engine is throttled down, and decreases as the throttle is opened. There is also high compression in the cylinder or cylinders, which is greatest when the throttle is wide open, and decreases as the throttle is closed. Our power actuator can, therefore, be readily operated by suction from the suction passage, as the intake manifold, or by compressed gases from a cylinder of the engine, or by both, as preferred, and as clearly set forth in our former application above referred to.

In the actual manufacture of these actuators, it is highly important that the reversing valve mechanism shall be so constructed as to prevent leakage and at the same time shall be of such simple construction as to enable said valve mechanism to be economically constructed and to be operated with the least possible friction.

Our present invention consists of an improved poppet valve mechanism which is particularly well adapted for use in connection with power actuators of the kind described and for any other purpose or purposes for which they may be found advantageous or desirable, and in our improved valve mechanism we prefer to so construct and arrange the valves and their seats that when said valves are in closed position, the higher pressures to which they are at any time exposed will always tend to hold them firmly upon their seats and prevent leakage. We also prefer to so construct our valve mechanism that the valves for the higher pressure and those for the lower pressure are arranged in pairs, each valve controlling a port or passage communicating with one end of the cylinder, one valve of each pair being opened simultaneously, while the other valve in each pair remain in closed position, and thus connecting one end of the cylinder with the source of higher pressure, and the other end with the source of lower pressure. In order to secure the proper operations of the valves with the least possible friction, we prefer to employ an actuating rod or member passing loosely through each valve and provided with means for making an air tight connection between the valve and the exterior surface of the actuating part, and in this connection we also propose to employ springs or other yielding means for normally holding the valves upon their seats and to provide the actuating part with means for engaging the valves and moving them into open position against the action of such springs. In the formation of such springs and air tight connections, we employ in some instances, a metallic construction furnishing both the air tight construction and the elastic pressure for maintaining the valves in closed position, or we may employ metallic springs in conjunction with cushioning material frictionally engaging the valves and actuating part to make an air tight connection therewith, or we may employ an elastic cushioning material which will supply both the necessary resiliency for mantaining the valves in closed position, and also the frictional engagement with the valves and actuating part to insure an air tight connection therewith, and we may also employ such elastic resilient cushioning material, either with or without auxiliary metallic yielding devices or springs for reinforcing the same, as may be found most advantageous or desirable. Our invention also consists in the details of construction hereinafter more specifically described and pointed out in the following description and claims.

Referring to the accompanying drawings, which illustrate several forms of our invention, selected by us for purposes of illustration, Fig. 1 is a sectional view of a power actuator embodying our invention, and illustrating one form of poppet valve reversing mechanism, especially arranged for use where the actuator is operated by vacuum working against atmospheric air.

Fig. 10 is a view similar to Fig. 2, showing the reversing valve mechanism arranged for use in an actuator operated by fluid pressure, operating against atmospheric air, or partial vacuum.

Fig. 11 is a detail section of a modified form of stuffing box which we prefer to employ in the ends of the cylinder when the actuator is operated by pressure, either in connection with atmospheric air or suction.

Figure 1:
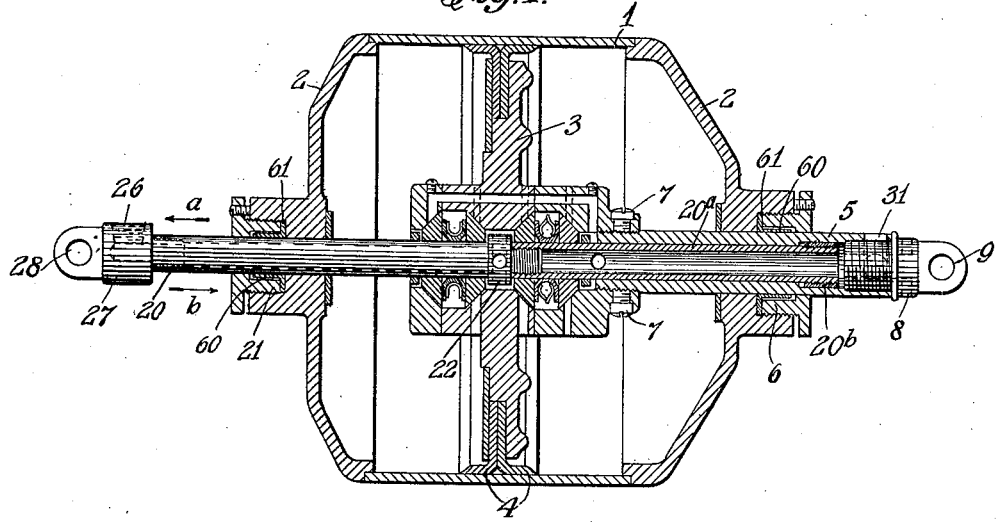
Figure 2:
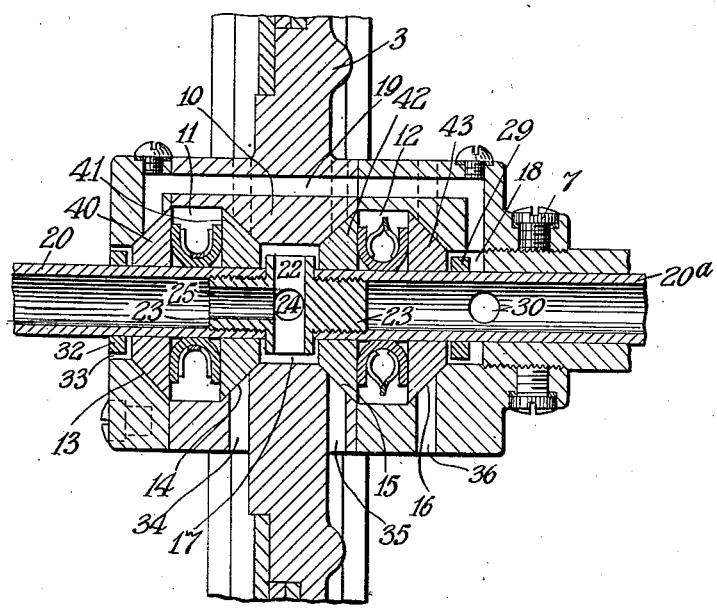
Fig. 2 is an enlarged sectional view of the valve mechanism shown in Fig. 1.
Figure 3:
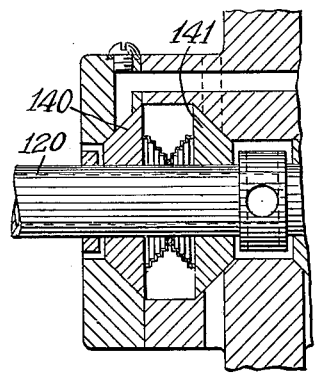
Fig. 3 is a detail view of a pair of poppet valves illustrating a metallic device for providing the functions of a retracting spring and a sealing device for preventing leakage between the valve and actuating part.

Referring to Figs. 1 and 2 of the accompanying drawings, which show a valve mechanism particularly adapted for use with suction operating against air at atmospheric pressure, 1, represents the cylinder of our improved actuators closed at its opposite ends by heads, 2, which may be connected by bolts (not shown), in the usual manner. 3 represents the double acting piston, provided with oppositely disposed gaskets, 4—4. 5 represents a hollow piston rod, which extends through a stuffing box, 6, in one end of the cylinder, and is provided at its inner end with threaded portions screwed into the hub of the piston and held against accidental displacement by set screws, 7. The outer end of the piston rod is preferably provided with a hollow screw plug, 8, having at its outer end, an attaching lug, or lugs, 9, by means of which it may be attached to the part to be actuated.

The hub, 10, of the actuator piston is provided with two valve chambers, 11 and 12, respectively, each of which is provided with two oppositely disposed valve seats, preferably conical and concentric to the axes of the piston. The valve chamber, 11, is shown as provided with the conical valve seats, 13, 14, and the valve chamber, 12, is shown as provided with conical valve seats, 15 and 16. The piston hub is provided between the valve chambers with an outlet or lower pressure chamber, indicated at 17, and communicating with each of the valve chambers, through the valve seats, 14 and 15 respectively, and a separate inlet or higher pressure chamber, 18, which likewise communicates with both of the valve chambers. The inlet or higher pressure chamber is conveniently arranged at one end of the piston, but in this instance, adjacent to the valve chamber, 12, with which it communicates through valve seat, 16, said chamber, 18, being also connected by a lateral passage, 19, with the valve seat, 13, of valve chamber, 11.

20 represents the valve actuating part consisting in this instance of a valve sleeve passing through a stuffing box, 21, in the cylinder head at the opposite end of the cylinder from the hollow piston rod, 5, and said sleeve also extends longitudinally through the piston hub, through the chambers 11, 17, 12 and 18, and into the hollow piston rod, 5, and is movable longitudinally with respect to the piston and piston rod, to effect the operation of the reversing valves hereinafter described. In order to connect the chambers, 17 and 18, of the piston head with the respective sources of higher and lower pressures for operating the actuator, we preferably form the valve sleeve in two parts, as 20 and 20ⁿ, connected centrally so that the two sections of the sleeve do not communicate. As shown, the sleeve section, 20 and 20ª, are screwed upon plugs, 23 projecting oppositely from, a collar 22 located in the outlet chamber, 17, thus uniting the sleeve sections, but preventing communication between them. The collar, 22, is provided with one or more lateral passages, 24, communicating with the interior of the sleeve section, 20, by means of a longitudinal passage, 25, in one of the plugs, 23, and also communicating with the outlet chamber, 17, which is of sufficiently greater diameter than the collar. 22, to provide an annular space within the chamber surrounding the collar. The outer end of the sleeve section, 20, is provided with a lateral outlet passage, 26, to the source of suction, located in this instance in a hollow fitting, 27, screwed into or upon the sleeve section, 20, and closed at its outer end. This fitting is conveniently provided with a perforated ear or lug, 28, by which it may be connected to a suitable manually operated or operator operated part, as the usual brake lever of an automobile provided with a retracting spring, or a hand operated lever, or other suitable device, for effecting the longitudinal movements of the valve sleeve. The section, 20ª, of the valve sleeve is provided with a collar, 29, within the inlet chamber, 18, and with one or more lateral apertures, 30, communicating with the said chamber. The rear end of the valve sleeve section, 20ª, communicates with the interior of the hollow piston rod, 5, which is provided with a lateral inlet aperture, 31, in this instance provided in the terminal plug, 8, and communicating with the interior of the piston rod. The valve sleeve section, 20, is also provided with a collar or flange, 32, on the forward side of the piston and preferably located in, but not tightly fitting an aperture, 33, in the piston hub of greater diameter than the valve stem and communicating with the valve seat, 13.

The outlet chamber is adapted to be connected with the cylinder on opposite sides of the piston. For this purpose the valve seat, 14, is provided with a passage or port 34, opening into the cylinder on the forward side of the piston, while the valve seat, 15, is provided with a similar port, 35, opening into the cylinder in rear of the piston, these valve seats being on opposite sides of the outlet chamber 17. In connection with the chamber, 18, we provide the valve seat, 16, with a passage, 36, communicating with the cylinder in rear of the piston, the chamber, 18, being connected with the cylinder forward of the piston by the passage, 19, to the valve seat, 13, which communicates with the aperture, 33.

In each of the valve chambers the valve stem section therein is provided with a pair of oppositely disposed valves, preferably conical, engaging the valve seats before described, located between two adjacent collars on the valve sleeve. These valves are not rigidly secured to the valve sleeve sections, but are mounted loosely thereon, permitting the actuating part or sleeve to move readily through the valves. These valves may be made of rubber or other suitable material, as leather, fibre, etc., having a certain degree of elasticity so that they will adapt themselves to their respective valve seats and make an air tight or gas tight connection therewith, or they maye be made of suitable metal if preferred. We have found that conical valves of molded rubber are especially well adapted for this purpose but we do not desire to be limited to this material nor to this particular form.

In the present instance we have shown the valve stem section, 20, provided with the oppositely arranged conical valves, 40 and 41, engaging valve seats, 13 and 14 respectively, within valve chamber, 11, and similar valves, 42 and 43, are arranged on sleeve section, 20ª.

It will be observed that the valves 40, 41, 42 and 43, are arranged in two pairs upon the same actuating device, to wit, the sleeve, 20—20ª, which is capable of moving freely through the valves, and is provided with the valve actuating collars, 32, 22 and 29, so arranged that when the sleeve is moved longitudinally in either direction, one valve of each pair is opened, to connect the inlet chamber with the cylinder on one side of the piston and the outlet chamber with the cylinder on the opposite side of the chamber. We provide each valve with yielding or cushioning means performing the function of a retracting spring, and with sealing means for effecting an air or gas tight joint between the actuating part or sleeve, and the valve. We prefer to locate said means between each pair of valves so that we may obtain the further functions, to wit, that said means will be compressed whenever the valve actuating sleeve is moved in either direction to open one valve of each pair, and thereby compress said intermediate spring and cushioning means, and increasing its effective pressure on the other valve of the pair to even more firmly hold it closed and prevent leaks, and to return the valve sleeve to neutral position when the actuating valve is released.

These retracting and sealing means may be provided by the same or different devices and may be provided in a wide variety of ways, some of which we have illustrated graphically in Figs. 3, 4, 5 and 6, for example. Thus in Fig. 3, we have shown the actuating part, 120, provided between a pair of valves, 140, 141, with a pair of oppositely disposed conical elastic diaphragms 150, having their inner edges soldered to the actuating part or sleeve, 120, and their outer edges each soldered to the adjacent face of one of the valves, 140, 141. In this instance a flexible elastic metallic diaphragm member provides both the functions of retracting and sealing. The actuating part can therefore be readily moved in either direction, to open one valve, or the other, and when so moved the diaphragm engaging the oppositely closed valve, will be compressed and the said valve will be pressed even more firmly upon its seat.

Figure 4:
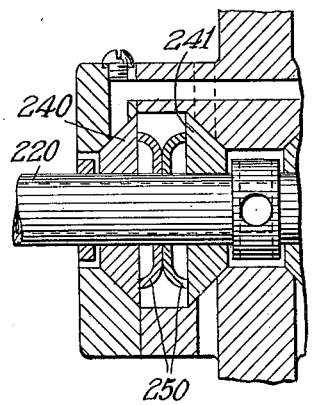
Fig. 4 is a similar view to Fig. 3, illustrating a modified construction, in which an elastic cushioning material is employed to provide both the functions of a retracting spring and sealing means.

In Fig. 4 we have shown a pair of opposed cup shaped rubber cushions, 250, provided with central apertures fitting upon the actuating part, 220, and forming an air tight joint therewith, and having the peripheral edges of each engaged in the adjacent face of the valve, 40, or 41, and making an air tight connection therewith, thus performing both the retracting and cushioning functions with respect to the valves, 240 and 241.

Figure 5:
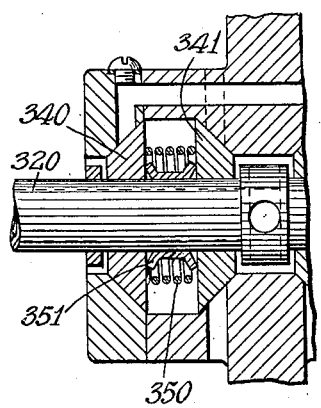
Fig. 5 is a similar view illustrating another modification, in which a metallic spring is employed to furnish the retracting spring function and suitable cushioning material is employed for sealing the same.

In Fig. 5, the valves, indicated at 340 and 341, are provided with a coil spring, 350, interposed between and serving as the retracting means for both, while a sealing member, 351, in the form of friction sleeve of suitable material, such as rubber, leather or the like, surrounds the actuating part, 320, and forms an air tight joint or connection therewith, said sleeve being provided at its opposite ends with annular flanges, 352, the edges of which engage and make air tight connections with the adjacent valves, thus providing the sealing means.

Figure 6:
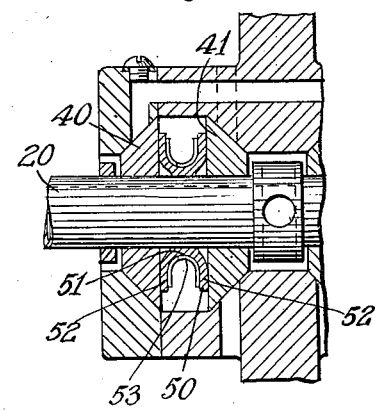
Fig. 6 is a similar view illustrating a construction in which both the retracting spring function and the sealing function are furnished by employing an elastic cushioning material, which as shown, is reinforced by yielding metallic spreader.

In Fig. 6 (and also in Figs. 1 and 2), we have shown our preferred construction, which consists of a cushioning member, 50, of rubber or other similar elastic material interposed between the valves, 42 and 43, said cushioning member performing both the retracting and sealing functions and having a central aperture fitting the sleeve, 20, or actuating part, and forming an air tight joint therewith, and having an annular peripheral groove, 51, providing two flanges, 52, which engage the faces of the adjacent valves and make air tight joints therewith. These cushioning devices may be used alone, but in some instances we prefer to provide them with reinforcing devices, or spreaders, two forms of which are illustrated, for example in Figs. 1 and 2, and are shown in detail in Figs. 7, 8 and 9. As shown in Figs. 6 and 9, and at the left in Figs. 1 and 2, such a spreader may be formed by making a cylinder, 53, of spring metal, slitting the opposite ends to form spring fingers, 54, and bending said fingers outwardly into the positions indicated in dotted lines in Fig. 9. For convenience, we term this the "U-shaped spreader". This spreader is placed within the annular groove, 51, of the cushion member, 50, and the fingers will press the flanges, 52, tightly against the valves, and will also increase the retracting force of the device.

Figure 7:
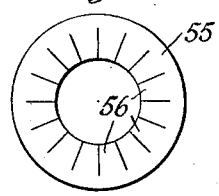
Fig. 7 is a plan view of the form of spreader shown to the right in Figs. 1 and 2.
Figure 8:
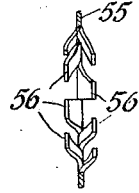
Fig. 8 is a sectional view of the form of the same.
Figure 9:
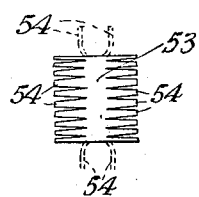
Fig. 9 is a sectional view of a slightly modified form of spreader shown in Fig. 6 and to the left in Figs. 1 and 2, before the spring arms are bent, two pairs of such arms being illustrated in dotted lines in the position which they assume after being bent into final form.

Another form of spreader which we term the "wish bone" spreader, is illustrated at the right in Figs. 1 and 2, and in plan and section in Figs. 7 and 8. This is formed by stamping an annulus, 55, out of spring material with radial slits extending outwardly from its inner edge and forming fingers, 56, which are bent outwardly alternately in opposite directions. These fingers are placed in the annular groove of the cushioning member, 50, and serve the same purpose as the U-shaped spreader.

Referring now to Figs. 1 and 2, the operation of the actuator is as follows, it being understood that the passage, 26, is connected with means for producing suction or rarification, as for example, the intake manifold of an internal combustion engine, in the manner set forth in our prior application before referred to, the actuating part or valve sleeve being connected to a foot pedal, hand lever, or other operator operated part (not shown) and the piston, 5, being connected to the part to be actuated.

It will be understood that when the parts are in the position shown in Figs. 1 and 2, all four of the poppet valves, 40, 41, 42 and 43 are seated and the piston is in a balanced or neutral condition. If, now, the operator operated part, to wit, the valve sleeve is moved forwardly in the direction of the arrow a in Fig. 1, the valve, 43, will be opened by collar, 29, and the valve, 41, will be opened by the collar, 22. This will place the inlet chamber 18, in communication with the cylinder in rear of the piston to the right in Figs. 1 and 2, through port, 36, admitting thereto the higher pressure fluid, and connecting the outlet chamber, 17, with the cylinder forward or to the left of the piston through the passage, 34. The piston will immediately move forward and continue to do so, so long as the forward movement of the valve sleeve continues. As soon as the valve sleeve stops the piston continues its movement until the valves have been restored to neutral position.

If the valve sleeve is moved rearwardly in the direction of the arrow b, in Fig. 1, the valves, 40 and 42, will be opened by the collars, 32 and 22 respectively, thus placing the inlet chamber, 18, in communication with the cylinder forward of the piston through passages, 19 and 33, and the outlet chamber, 17, in connection with the cylinder in rear of the piston through the passage, 35. The piston will move rearwardly until the movement of the sleeve stops, when the further movement of the piston will restore the valves to neutral position.

It will be seen that whenever the valve sleeve is moved in either direction to open one set of valves, the retracting devices in said chambers between the valves thereof will be compressed, thereby applying additional force to the valves which are not actuated to compress them upon their seats. The retracting devices also tend to counteract the tendency of the piston to move the valve sleeve with it, when the piston begins to move in either direction, by reason of frictional engagement between them, or between the valve sleeve and the seated valves, which might otherwise cause a movement of the valve sleeve greater than is intended, unless the operator applies varying pressures to the foot lever, to his inconvenience. It will also be observed in this instance that, as the apparatus is operated by suction, and a partial vacuum normally exists in the suction chamber, 17, the effect of the suction is not only to seat the valves, 41 and 42, and float the valve sleeve, on opposite sides of the suction chamber, but also to hold them seated and prevent leakage.

It is to be understood that our invention is applicable to actuators operated by suction alone, or by compressed fluid alone, or by both suction and compressed fluid, the last named being particularly efficient when the inlet chamber is connected with a suitable pressure tank supplied from a cylinder of an internal combustion engine, and the outlet chamber is connected with a suction passage thereof, as in such case the actuator may be operated at times by suction, at other times by pressure, and at times by both pressure and suction, as conditions of operation of the engine change.

The apparatus hereinbefore described would function under any of these conditions, but in order to obtain all the advantageous results of our invention without employing unnecessarily heavy retracting devices, which at times retard the operation of the device, we prefer to slightly rearrange the positions of the valves and their seats, where pressure fluid, or pressure fluid and vacuum are to be employed.

In Fig. 10 we have illustrated such an arrangement of the poppet valve mechanism which can be advantageously employed where pressure above atmospheric is employed on one face of the piston against atmospheric air or against a partial vacuum (suction). In this figure, 403 represents the piston hub, on which is provided two pairs of aligned valve seats, 413—414—415—416, in which are fitted poppet valves, 440, 441, 442, 443, arranged in pairs on opposite sides of a central pressure chamber, 417, in the center of the piston hub. The valve seats, 414, and 415, on opposite sides of the pressure chamber are provided with radial ports, 434, and 435, communicating with the cylinder on opposite sides of the piston, and the valve seats, 413 and 416, are connected by ports or passages, 433 and 436, with the cylinder on opposite sides of the piston. The piston hub is also provided with a low pressure or vacuum chamber, 418, located adjacent to the one end of the hub. The valve actuating part or valve sleeve, 420—420$^a$, is constructed substantially as shown in Fig. 2, but in this instance, as the positions of the valves are reversed from the positions of those shown in Fig. 2, the said actuating part, which extends loosely through registering apertures in all four of the valves, is provided with a collar, 422, located between the valves, 440 and 441, and a similar collar, 422$^a$, between the valves, 442 and 443, for opening one valve of each pair when the actuating device is moved in either direction. Pressure fluid is introduced into the pressure chamber, 417, by means of a longitudinal passage in the sleeve section, 420, communicating by one or more apertures, 424, with the pressure chamber between the valves, 441 and 442, which will therefore be held upon their seats when in closed position by the pressure fluid. The low pressure chamber, 418, communicates with the interior of the sleeve section, 420, by an aperture, 430, and thence to either the atmosphere or a source of rarification, as the intake manifold of an internal combustion engine, or other suction means. The suction chamber, 418, is connected by a by-pass, 419, with the valve seat, 413, and communicates directly with the valve seat, 416, so that there will be no tendency to withdraw the valves, 440 and 443, from their seats. Each of the valves is provided with means for holding it yieldingly seated, and for sealing the central aperture in the valve through which the actuating device passes. In the present instance we have shown the valve sleeve provided with a fixed collar, 425, in the center of the pressure chamber, between the valves, 441 and 442, and with a fixed collar, 426, on the outer side of the valve, 443, and a similar collar, 427, on the outer side of the valve, 440, and between these collars and their respective valves, we have shown cushioning devices of elastic rubber, indicated at 450, having central apertures frictionally engaging the actuating device or sleeve, and flange portions for engaging the face of the adjacent valve. These cushioning devices provide the necessary yielding pressure for holding the valves normally in closed positions, and at the same time making an air-tight connection between each valve and the actuating valve, thus sealing the central apertures of the valve against leakage. It will also be seen that whenever the actuating device, or sleeve, 420—420ª, is moved in either direction, one valve of each pair will be opened, thus admitting pressure to the cylinder on one side of the piston, and connecting the other end of the cylinder with the atmosphere, or with a source of low pressure less than atmosphere, while at the same time, the cushioning devices for the other two valves which remain closed, will be somewhat compressed, thus increasing their pressure upon the valves, and holding them firmly seated.

In connection with the actuator cylinder, we prefer to employ a stuffing box for the valve actuating part, and for the piston rod, so constructed that they will prevent leakage while at the same time imposing as little friction on the moving parts as possible. Thus, in Fig. 1, in which the valve mechanism is arranged with special reference to the use of vacuum operating against atmospheric air, we prefer to employ the construction therein illustrated, which consists of a sleeve, 60, of molded rubber, surrounding the longitudinally movable part and provided on its inner end with a flange, 61, engaging the bottom face of the stuffing box against which it is compressed by the gland of the stuffing box, which loosely surrounds the sleeve, 60. As in this case any leakage will be from outside inward, it would tend to exert pressure on the exterior of the sleeve, 60, and hold it the more tightly against the piston rod or valve sleeve, as the case may be.

Where pressure fluid above atmospheric pressure is introduced into the interior of the cylinder, we prefer to employ a different form of packing for the stuffing boxes, as illustrated in Fig. 11, for example. In this figure the stuffing box is illustrated at 406, and the packing sleeve is illustrated at 460, provided with the flange, 461, engaged by the gland. In this instance the sleeve, 460, is provided with a conical projecting portion, 462, extending into a conical recess at the bottom of the stuffing box and firmly pressed therein by the gland so as to prevent leakage. It is to be understood, however, that we do not limit ourselves to any particular form of stuffing box for use in connection with our device.

In the operation of our improved actuator herein shown and described, we prefer to provide means for limiting the extent of movement of the valve actuating part, or in other words, the valve sleeve, with resect to the piston and piston rod, in order to protect the valve mechanism, and further so that in case of failure of the actuator to perform all the desired work when the valve mechanism is operated, the piston and piston rod may nevertheless be actuated in either direction by means of the operator operated part connected with the valve sleeve. This may be accomplished in many ways, as set forth in our former application above referred to. In the present instance we have shown the following arrangement for this purpose. The valve sleeve section, 20ª, is provided with a collar, 20ᵇ, secured thereto and operating between shoulders provided forward and rearward of said collar; a certain amount of play being permitted between said shoulders and the stop collar, 20ᵇ, to allow sufficient movement of the valve sleeve in either direction before engaging one or the other of the shoulders to effect the proper operation of the valve mechanism. When this movement has been accomplished, the valves will be in proper position to effect the desired movement of the piston, which will immediately take place if the differential pressures are present, and if for any reason the actuator does not operate with sufficient power, the additional physical force of the operator can be exerted in the same direction through the operator operated part connected with the sleeve, 20—20ª. Obviously, should there be a failure of the differential pressures for actuating the actuator, the actuator piston and piston rod may be positively operated in either direction by means of the valve sleeve, 20—20ª, after it has been moved far enough to bring the collar, 20ᵇ, in contact with either of the adjacent shoulders, and the movement of the valve sleeve into such position in either direction will set the valve in such a manner as to vent one end of the cylinder and facilitate the movement of the piston and piston rod in the desired direction by the physical strength of the operator. This mechanism, however, does not form any part of our present invention and is not specifically claimed herein.

What we claim and desire to secure by Letters Patent is:—

1. In a poppet valve mechanism, the combination with a valve seat, of a poppet valve for engaging said seat, provided with an axial aperture extending entirely through the valve, of a non-rotating actuating part extending entirely through said aperture, and fitting the same to support the valve co-axially with said seat, and capable of longitudinal movement with respect to the valve, means for yieldingly holding said valve on its seat and for making a gas tight joint at all times between the valve and said actuating part, to prevent the passage of gaseous pressure fluid between the valve and its actuating part when the valve is seated, and means on the actuating part for engaging the valve to unseat it.

2. In a poppet valve mechanism, the combination with a valve seat, of a poppet valve for engaging said seat, provided with an axial aperture extending entirely through the valve, of a non-rotating actuating part extending entirely through said aperture, and fitting the same to support the valve co-axially with said seat, and capable of longitudinal movement with respect to the valve, means including portions of molded compressible elastic material surrounding said actuating part for forming a gas tight joint between the valve and said actuating part, and holding it yieldingly seated to prevent the passage of gaseous pressure fluid between the valve and its seat and between the valve and said actuating part when the valve is seated, and means on said actuating part for moving said valve in a direction to unseat it.

3. In a poppet valve mechanism, the combination with a valve seat, of a poppet valve for engaging said seat, and provided with an aperture therein, an actuating part extending through said aperture and capable of longitudinal movement with respect to said valve, and means independent of said actuating part including an elastic cushioning member of rubber having a frictional engagement with the said actuating part, and with a face connected with the valve, for sealing said aperture, for yieldingly holding said valve on its seat and for making a tight joint between the valve and said actuating part, and means on said actuating part for engaging the valve when moved in one direction only to open the same, the movement of said actuating part in the opposite direction having no operative effect on said valve.

4. In a poppet valve mechanism, the combination with a valve seat, of a poppet valve for engaging said seat, and provided with an aperture therein, an actuating part extending through said aperture and capable of longitudinal movement with respect to said valve, and means independent of said actuating part including an elastic cushioning member of rubber having a frictional engagement with the said actuating part and with a face connected with the valve for sealing said aperture, and a metallic spring member for reinforcing said cushioning member, for yieldingly holding said valve on its seat and for making a tight joint between the valve and said actuating part, and means on said actuating part for engaging the valve when moved in one direction only to open the same, the movement of said actuating part in the opposite direction having no operative effect on said valve.

5. In a poppet valve mechanism, the combination with a valve seat, of a poppet valve for engaging said seat, and provided with an aperture therein, an actuating part extending through said aperture and capable of longitudinal movement with respect to said valve, and means including an elastic cushioning member of rubber having an aperture therethrough for said actuating part, and frictionally engaging the actuating part, and a face connected with the valve for sealing the aperture therein, said cushioning member having an annular groove therein, and an annular spreader of spring metal engaging said groove, and forming means for yieldingly holding said valve on its seat and for making a tight joint between the valve and said actuating part, and means on said actuating part for engaging the valve to open the same.

6. In poppet valve mechanism, the combination with a valve chamber provided with oppositely disposed coaxial valve seats, of a pair of oppositely disposed valves for engaging said seats, each provided with an axial aperture, a non-rotating actuating part movable longitudinally in both directions, extending entirely through both valves and holding said valves in co-axial relation with their respective seats, and movable longitudinally with respect to each valve, said valves being provided with means for making a gas tight joint between them and the actuating part, and for holding them yieldingly seated, without interfering with the longitudinal movement of the actuating part with respect thereto, to prevent passage of gaseous pressure fluid between the valves and their seats, or between the valves and the actuating part when the valves are seated, said actuating part being provided on opposite sides of said pair of valves with valve engaging parts to unseat one valve of the pair when moved in either direction.

7. In a poppet valve mechanism, the combination of a pair of oppositely disposed seats, a pair of oppositely disposed valves for engaging said seats, said valves being provided with registering apertures, an actuating part extending through both valves and fitting said apertures and supporting the valves in coaxial relation with their seats, and being provided with means for engaging said valves in a direction to open one only when the actuating part is moved longitudinally in either direction, and means interposed between said valves for holding them yieldingly upon their respective seats and for sealing said apertures, including an annular cushioning member of molded elastic rubber, having an aperture therein, the walls of which engage said actuating part and form a gas-tight joint therewith, and provided with flanges engaging a face connected with each of said valves, and forming a gas-tight joint therewith.

8. In a poppet valve mechanism, the combination of a pair of oppositely disposed seats, a pair of oppositely disposed valves for engaging said seats, said valves being provided with registering apertures, an actuating part extending loosely through said apertures and provided with means for engaging said valves in a direction to open one only when the actuating part is moved longitudinally in either direction, and means interposed between said valves for holding them yieldingly upon their respective seats and for sealing said apertures, including an annular member of compressible material having an aperture, the walls of which frictionally engage said actuating part, and provided with flanges frictionally engaging faces connected with said valves, and provided with an annular peripherial groove between said flanges and an annular spreader of elastic metal located in said annular groove.

9. In a poppet valve mechanism, the combination of a pair of oppositely disposed seats, a pair of oppositely disposed valves for engaging said seats, said valves being provided with registering apertures, an actuating part extending loosely through said aperture and provided with means for engaging said valves in a direction to open them one only when the actuating part is moved longitudinally in either direction, and means interposed between said valves for holding them yieldingly upon their respective seats and for sealing said apertures, including an annular member of compressible material having an aperture, the walls of which frictionally engage said actuating part, and provided with flanges frictionally engaging faces connected with said valves, and provided with an annular groove between said flanges, and a spreader of elastic metal located in said groove, and provided with a plurality of spring fingers for engaging said flanges and pressing them in opposite directions.

10. In a power actuator, the combination with a cylinder and a piston therein, means for connecting the cylinder with a source of suction and with the atmosphere, of poppet valve mechanism comprising a valve chamber provided with oppositely disposed coaxial seats, a suction valve for controlling the connection between the suction source and the cylinder for engaging one of said seats, an oppositely disposed air inlet valve engaging the other seat for controlling the connection between the cylinder and the atmosphere, said valves having central apertures therein, an actuating part extending through the central apertures of said valves, and supporting them in coaxial relation with said seats, means for holding said valves yieldingly on their seats, and for forming an air tight joint between the valves and said actuating part without interfering with the longitudinal movement thereof with respect to the valves, and said actuating part being provided with means for engaging and opening one of said valves when said actuating part moves longitudinally in each direction.

11. The combination with a power actuator deriving its source of pressure, from the suction passage of an internal combustion engine and a source of higher pressure, said actuator including a piston operating in a cylinder, tubular passages for connecting the cylinder with said suction passage and with the source of higher pressure, of poppet valve mechanism comprising a valve chamber provided with oppositely disposed coaxial valve seats, a suction valve for controlling the connection between the suction passage and the cylinder, for engaging one of said seats, an oppositely disposed inlet valve engaging the other seat for controlling a connection between the cylinder and the source of higher pressure, said valves being provided with central apertures, a non-rotating longitudinally movable actuating part extending through the central apertures of said valves and supporting them in axial relation with said seats, means for holding said valves yieldingly on their seats and for forming an air tight joint between the valves and said actuating part without interfering with the longitudinal movement thereof with respect to the valves, said actuating part being provided with means for engaging and opening one of said valves when moved longitudinally in each direction.

12. The combination with a power actuator deriving its source of pressure, from the suction passage of an internal combustion engine and a source of higher pressure, said actuator including a piston operating in a cylinder, and tubular passages for connecting the cylinder with said suction passage and with the source of higher pressure, of poppet valve mechanism located in the piston of the actuator and comprising a valve chamber formed in said piston and provided with oppositely disposed coaxial inlet and suction valve seats, oppositely disposed suction and inlet valves for engaging said seats provided with central apertures, an actuating part extending through the central apertures in said valves and through one end of the cylinder and supporting said valves in coaxial relation with their seats, means for holding said valves yieldingly on their seats and for forming a fluid tight joint between the valves and said actuating part without interfering with the longitudinal movement thereof with respect to the valves, and means on said actuating part for engaging and opening one of said valves by a longitudinal movement of said actuating part in each direction.

13. The combination with a power actuator deriving its source of pressure, from the suction passage of an internal combustion engine and a source of higher pressure, said actuator including a piston operating in a cylinder, and tubular passages for connecting the cylinder with said suction passage and with the source of higher pressure, of poppet valve mechanism located in the piston of the actuator and comprising a valve chamber formed in said piston and provided with oppositely disposed coaxial inlet and suction valve seats, oppositely disposed suction and inlet valves for engaging said seats provided with central apertures, an actuating part extending through the central apertures in said valves and through one end of the cylinder and supporting said valves in coaxial relation with their seats, means for holding said valves yieldingly on their seats and for forming a fluid tight joint between the valves and said actuating part without interfering with the longitudinal movement thereof with respect to the valves, including yielding devices located between said valves, said actuating part being provided on opposite sides of said valve chamber with valve engaging devices for unseating one of said valves when said actuating part is moved longitudinally in either direction.

14. In a poppet valve mechanism, the combination with two pairs of oppositely disposed valve seats in axial alignment, and two pairs of valves for engaging said seats, the valves of each pair being oppositely disposed and said valves being provided with registering apertures, of a single actuating part extending loosely through the apertures of all of said valves, means on said actuating part for engaging and opening one valve only of each pair when said actuating part is moved longitudinally in either direction, an annular cushioning device of elastic rubber located between the valves of each pair, each having an aperture, the walls of which frictionally engage the actuating part, and lateral flange portions engaging the opposed faces of the adjacent valves for normally seating said valves, and sealing the apertures therein, whereby the movement of said actuating part in either direction to unseat a valve of each pair will compress said cushioning devices and increase the pressure thereof upon the seated valves.

15. In a poppet valve mechanism, the combination with two pairs of oppositely disposed valve seats in axial alignment, and two pairs of oppositely disposed valves for engaging said seats, said valves being provided with registering apertures, of a single actuating part extending loosely through the apertures of all of said valves, means on said actuating part for engaging and opening one valve of each pair when said actuating part is moved longitudinally in either direction, an annular cushioning device of elastic rubber located between the valves of each pair, each having an aperture, the walls of which frictionally engage the actuating part, and lateral flange portions engaging the opposed faces of the adjacent valves for normally seating said valves, and sealing the apertures therein, each of said annular cushioning devices having an annular peripheral groove between said flanges, and an annular spreader of elastic metal located in said groove and provided with portions for yieldingly engaging said flanges to reinforce said annular cushioning device.

16. In a power actuator, the combination with a cylinder, a double acting piston therein, and means for producing differential fluid pressures on opposite faces of the piston, of a reversing valve mechanism for said actuator comprising two pairs of valves and seats controlling ports communicating with said cylinder on opposite faces of the piston, a single actuating part extending through registering apertures in said valves and having movement with respect to said valves, valve actuating devices on said actuating part for engaging and opening one valve of each pair, when the actuating part is moved in either direction, the low pressure valves and seats therefor being so constructed that said valves will normally be seated and held upon their seats by pressure of the controlled pressure fluid when in closed position, and means for normally holding all of said valves yieldingly upon their seats, and for sealing the registering apertures through which the actuating part extends.

17. In a power actuator, the combination with a cylinder, a double acting piston therein, and means for producing differential fluid pressures on opposite faces of the piston, of a reversing valve mechanism for said actuator comprising two pairs of valves and seats controlling ports communicating with said cylinder on opposite faces of the piston, a single actuating part extending through registering apertures in said valves and having movement with respect to said valves, valve actuating devices on said actuating part for engaging and opening one valve of each pair, when the actuating part is moved in either direction, the low pressure valves and seats therefor being so constructed that said valves will normally be seated and held upon their seats by pressure of the controlled pressure fluid when in closed position, and means for normally holding all of said valves yieldingly upon their seats, and for sealing the registering apertures through which the actuating part extends, said means being so constructed that the movement of said actuating part in either direction to open one valve of each pair will increase the pressure upon the other valves in a direction toward their seats.

18. In a power actuator, the combination with a cylinder, a double acting piston therein, and means for producing differential fluid pressures on opposite faces of the piston, of a reversing valve mechanism for said actuator comprising two pairs of valves and seats, controlling ports communicating with said cylinder on opposite faces of the piston, a single actuating part extending through registering apertures in said valves and having movement with respect to said valves, valve actuating devices on said actuating part for engaging and opening one valve of each pair, when the actuating part is moved in either direction, the low pressure valves and seats therefor being so constructed that said valves will normally be held upon their seats by pressure of the controlled pressure fluid when in closed position, cushioning devices of elastic rubber located between each pair of said valves, provided with apertures fitting said actuating part, and flanges frictionally engaging faces connected with the adjacent valves for sealing the said apertures and holding all of said valves normally seated, whereby when said actuating part is moved in either direction to open one valve of each pair, the cushioning devices will be compressed and will increase their pressure upon the other valves to hold them seated.

19. In a power actuator, the combination with a cylinder, a double acting piston therein, and means for producing differential fluid pressures on opposite faces of the piston, of a reversing valve mechanism for said actuator comprising two pairs of valves and seats, controlling ports communicating with said cylinder on opposite faces of the piston, a single actuating part extending through registering apertures in said valves and having movement with respect to said valves, valve actuating devices on said actuating part for engaging and opening one valve of each pair, when the actuating part is moved in either direction, the low pressure valves and seats therefor being so constructed that said valves will normally be held upon their seats by pressure of the controlled pressure fluid when in closed position, cushioning devices of elastic rubber located between each pair of said valves, provided with apertures fitting said actuating part, and flanges frictionally engaging faces connected with the adjacent valves for sealing the said apertures and holding all of said valves normally seated, whereby when said actuating part is moved in either direction to open one valve of each pair, the cushioning devices will be compressed and will increase their pressure upon the other valves to hold them seated, each of said cushioning devices being provided with an annular groove between the flanges thereof and an elastic metallic annular spreader located in each of said annular grooves.

20. The combination with a power actuator deriving its source of pressure, from the suction passage of an internal combustion engine and a source of higher pressure, said actuator including a piston operating within a cylinder, of poppet valve mechanism comprising a pair of coaxial valve chambers provided with oppositely disposed inlet and suction valve seats, and inlet and suction valves for engaging said seats, all of said valves and seats being coaxial, a suction chamber between said valve chambers and communicating therewith through the suction valve seats, means for connecting said suction chamber with the suction passage of the engine, and means for connecting the inlet valve seats with the source of higher pressure, each of said valve chambers being provided with inlet and suction ports communicating with the cylinder on one side of the piston therein, a nonrotating longitudinally movable actuating part extending through all of said valves and supporting them in coaxial relation with their seats and movable longitudinally with respect to the valves, means for normally holding said valves yieldingly in engagement with their seats and for making a fluid tight connection between said valves and said actuating part, and valve operating means on said actuating part between said suction valves and on the outer faces of the inlet valves, whereby the longitudinal movement of said actuating part in either direction will open the suction valve in one valve chamber, and the one air higher pressure valve in the other valve chamber.

21. The combination with a power actuator deriving its source of pressure, from the suction passage of an internal combustion engine and the atmosphere, said actuator including a piston operating within a cylinder, of poppet valve mechanism located in the piston of the actuator and comprising a pair of coaxial valve chambers each provided with oppositely disposed suction and air inlet valve seats, all of said valve seats being coaxial, a suction valve and air inlet valve in each chamber, said valves being provided with central apertures therein, a suction passage located in the piston between said valve chambers and communicating therewith through the suction valve, means for connecting the air inlet valve seats with the source of higher pressure, a longitudinally movable valve actuating part extending through all of said valves and supporting them coaxially with respect to their seats, said part extending through one end of the actuator cylinder, means for yieldingly pressing each of said valves on its seat and forming an air tight joint between each valve and the said actuating part without interfering with the longitudinal movement of said part with respect to the valves, valve operating devices on said actuating part on opposite sides of the valves in each valve chamber, said valve actuating part having a longitudinal passage communicating with the suction chamber, and means for connecting the interior passage of said valve actuating part with the suction passage of the engine, said piston being provided with ports controlled by said valves for connecting the cylinder on opposite sides of the piston with the suction chamber and with the atmosphere, the longitudinal movement of said valve actuating part in either direction being effective to open the suction valve in one valve chamber and the air higher pressure valve in the other valve chamber.

22. In combination, a pair of oppositely disposed valve seats, oppositely disposed valves engageable with said seats, an operating part for said valves passing through apertures therein, and means arranged between the valves and engageable with the operating part and adapted to seal the apertures through the valves.

23. In combination, a pair of oppositely disposed valve seats, oppositely disposed valves engageable with said seats, an operating part for said valves passing through apertures therein, and means arranged between the valves and normally acting to force the valves toward their seats, said means producing a sealing contact between the operating means and the valves and preventing the passage of pressure fluid past the valve through said apertures.

24. In combination, a pair of oppositely disposed valve seats, oppositely disposed valves engageable with said seats, an operating part for said valves passing through apertures therein, means arranged between the valves and engageable with the operating part and adapted to seal the apertures through the valves, and means on the operating member adapted to move either of the valves away from its seat and simultaneously act through said sealing means to hold the other valve more firmly on its seat.

25. In combination, a pair of oppositely disposed valve seats, oppositely disposed valves engageable with said seats, an operating part for said valves passing through apertures therein, means arranged between the valves and normally acting to force the valves toward their seats, said means producing a sealing contact between the operating means and the valves and preventing the passage of pressure fluid past the valve through said apertures, and means on the operating member adapted to move either of the valves away from its seat and simultaneously act through said sealing means to hold the other valve more firmly on its seat.

26. In combination, a pair of oppositely disposed valve seats, oppositely disposed valves engageable with said seats, an operating part for said valves passing through apertures therein and movable with and with respect to the valves and having an aperture the walls of which engage said actuating part and form a gas-tight joint therewith and having means to engage faces on the valves to produce a gas-tight joint with said valves and thereby seal the apertures through the valves and any axial flow of pressure along the operating part, said means being movable with and with respect to the operating part.

27. The combination with a valve seat and an operating member extending therethrough, of an apertured valve positioned on said operating member and movable with and with respect to the same, means carried by the operating member for positively actuating the valve in one direction, and a resilient member arranged in sealing engagement with the operating member and with the valve for resiliently pressing the valve against its seat, said member adapted to seal the opening in the valve through which the operating member passes.

28. In combination, a valve stem, spaced valves on said stem, and movable with respect to each other and to said valve stem, and packing means arranged between said valves and engageable with each and with the valve stem to prevent passage of fluid around said valve stem in either direction.

29. In combination, a valve stem, a pair of valves mounted on said stem and movable with relation to each other and to said valve stem, and a packing element interposed between said valves and arranged to prevent the passage of fluid around said valve stem in either direction, said packing means serving normally to hold said valves in separated relation.

In testimony whereof we affix our signatures.

CALEB S. BRAGG.
VICTOR W. KLIESRATH.